United States Patent
Kleber

(10) Patent No.: US 8,466,593 B2
(45) Date of Patent: Jun. 18, 2013

(54) ROTOR FOR AN INDUCTION MOTOR AND METHOD FOR FABRICATING

(75) Inventor: Richard M. Kleber, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 187 days.

(21) Appl. No.: 13/033,905

(22) Filed: Feb. 24, 2011

(65) Prior Publication Data

US 2012/0217837 A1 Aug. 30, 2012

(51) Int. Cl.
*H02K 17/00* (2006.01)

(52) U.S. Cl.
USPC ............................................ 310/211; 310/125

(58) Field of Classification Search
USPC ..... 310/211, 212, 125, 151, 197; 29/596–598
See application file for complete search history.

(56) References Cited

U.S. PATENT DOCUMENTS

| | | | | |
|---|---|---|---|---|
| 3,705,971 | A | * | 12/1972 | Jacovides et al. ........ 219/121.14 |
| 3,902,087 | A | * | 8/1975 | Hakamada et al. ........... 310/211 |
| 4,249,098 | A | * | 2/1981 | Karlen et al. .................. 310/183 |
| 4,453,101 | A | * | 6/1984 | Nelson .......................... 310/211 |
| 4,885,494 | A | * | 12/1989 | Higashi ......................... 505/166 |
| 5,068,560 | A | * | 11/1991 | Lundquist ..................... 310/125 |
| 6,198,181 | B1 | * | 3/2001 | Ali et al. ...................... 310/261.1 |
| 2004/0113508 | A1 | | 6/2004 | Yasuhara et al. |
| 2006/0066157 | A1 | | 3/2006 | Rajmohan et al. |
| 2008/0185934 | A1 | * | 8/2008 | Verhoeven .................... 310/211 |
| 2008/0296993 | A1 | * | 12/2008 | Weihrauch .................... 310/211 |
| 2011/0175484 | A1 | * | 7/2011 | Wang et al. ................... 310/211 |

FOREIGN PATENT DOCUMENTS

CH 431 702 A 3/1967

OTHER PUBLICATIONS

U.S. Appl. No. 12/691,217, Wang.
U.S. Appl. No. 12/954,115, Gerard.
U.S. Appl. No. 12/954,080, Gerard.
U.S. Appl. No. 12/872,036, Osborne.
U.S. Appl. No. 13/032,771, Wang.
U.S. Appl. No. 13/037,040, Kleber.
Raskop, Leitfaden fur die Herstellung der Wicklungen an elektrischen Maschinen, Transformatoren, Starkstromapparaten und Kleinstmotoren; Beratender Ingenieur fur Elektromaschinebau; 1967; Berlin, Germany.

* cited by examiner

*Primary Examiner* — Thanh Lam

(57) ABSTRACT

A method for fabricating a rotor assembly for an induction motor includes assembling a shorting end ring onto the rotor assembly which includes a steel laminate stack and a plurality of conductor bars. The shorting end ring includes a plurality of grooves aligned with corresponding portions of the conductor bars extending from a first end of the steel laminate stack. Assembling includes inserting the corresponding portions of the conductor bars into the grooves of the shorting end ring. The shorting end ring is affixed to the rotor assembly by applying a compressive force around a perimeter of the shorting end ring to deform the conductor bars.

15 Claims, 3 Drawing Sheets

ROTOR FOR AN INDUCTION MOTOR AND METHOD FOR FABRICATING

TECHNICAL FIELD

This disclosure is related to rotors for induction motors.

BACKGROUND

The statements in this section merely provide background information related to the present disclosure and may not constitute prior art.

An electric-powered induction motor transforms electric power to mechanical torque by inducing rotating magnetic fields between a static element, i.e., a stator, and a rotatable element, i.e., a rotor. The rotating magnetic fields generate torque on a shaft coupled to the rotor through conductor bars. Known stators induce current flows through conductor bars on the rotor that are preferably parallel to an axis of rotation of the rotor.

A known rotor for an induction motor includes a stack of steel sheets (i.e. laminated steel stack) assembled onto a rotatable shaft and a plurality of conductor bars fabricated from conductive material, e.g., copper or aluminum. The conductor bars are contained in conductor bar grooves axially defined at the outer periphery of the laminated steel stack and are preferably connected at both axial ends of the rotor using shorting end rings.

Known rotor fabrication methods include placing the laminated steel stack into a casting mold and introducing molten material into open spaces formed in the rotor and open spaces between the mold and the laminated steel stack to form the shorting end rings and conductor bars. It is known that oxide inclusions and voids may be formed in the conductor bars and shorting end rings during mold filling of molten material and solidification. The molten material may cool and partially solidify during turbulent flow of the molten material into the plurality of conductor bar grooves due in part to exposure to surface areas of the conductor bar grooves. The partially solidified molten material may impede molten material flow and cause voids, oxide inclusions, and other discontinuities in the conductor bars and the shorting end rings.

Power density output from an electric induction motor correlates to quality of the conductor bars and mass bulk density of the individual conductor bars. It is known that voids formed in the conductor bars and the shorting end rings during fabrication reduce power density output of the electric induction motor. The presence of oxide occlusions and cracks due to hot tearing reduces the electric conductivity of the conductor bars and shorting end rings, thereby reducing the power density of the motor.

The use of copper material for conductor bars and/or shorting end rings may increase power density and heat transfer characteristics of an induction motor as compared to an induction motor using aluminum conductor bars and aluminum shorting end rings. Known use of copper material for conductor bars and shorting end rings increases manufacturing process times and complexity as compared to aluminum conductor bars. Known manufacturing processes for manufacturing conductor bars and shorting end rings include casting the conductor bars and shorting end rings in place around the laminate stack. Another common approach is to pre-manufacture the conductor bars and shorting end rings for assembling onto the laminate stack to be welded or brazed in place.

SUMMARY

A method for fabricating a rotor assembly for an induction motor includes assembling a shorting end ring onto the rotor assembly which includes a steel laminate stack and a plurality of conductor bars. The shorting end ring includes a plurality of grooves aligned with corresponding portions of the conductor bars extending from a first end of the steel laminate stack. Assembling includes inserting the corresponding portions of the conductor bars into the grooves of the shorting end ring. The shorting end ring is affixed to the rotor assembly by applying a compressive force around a perimeter of the shorting end ring to deform the conductor bars.

BRIEF DESCRIPTION OF THE DRAWINGS

One or more embodiments will now be described, by way of example, with reference to the accompanying drawings, in which.

DETAILED DESCRIPTION

Figure 1:
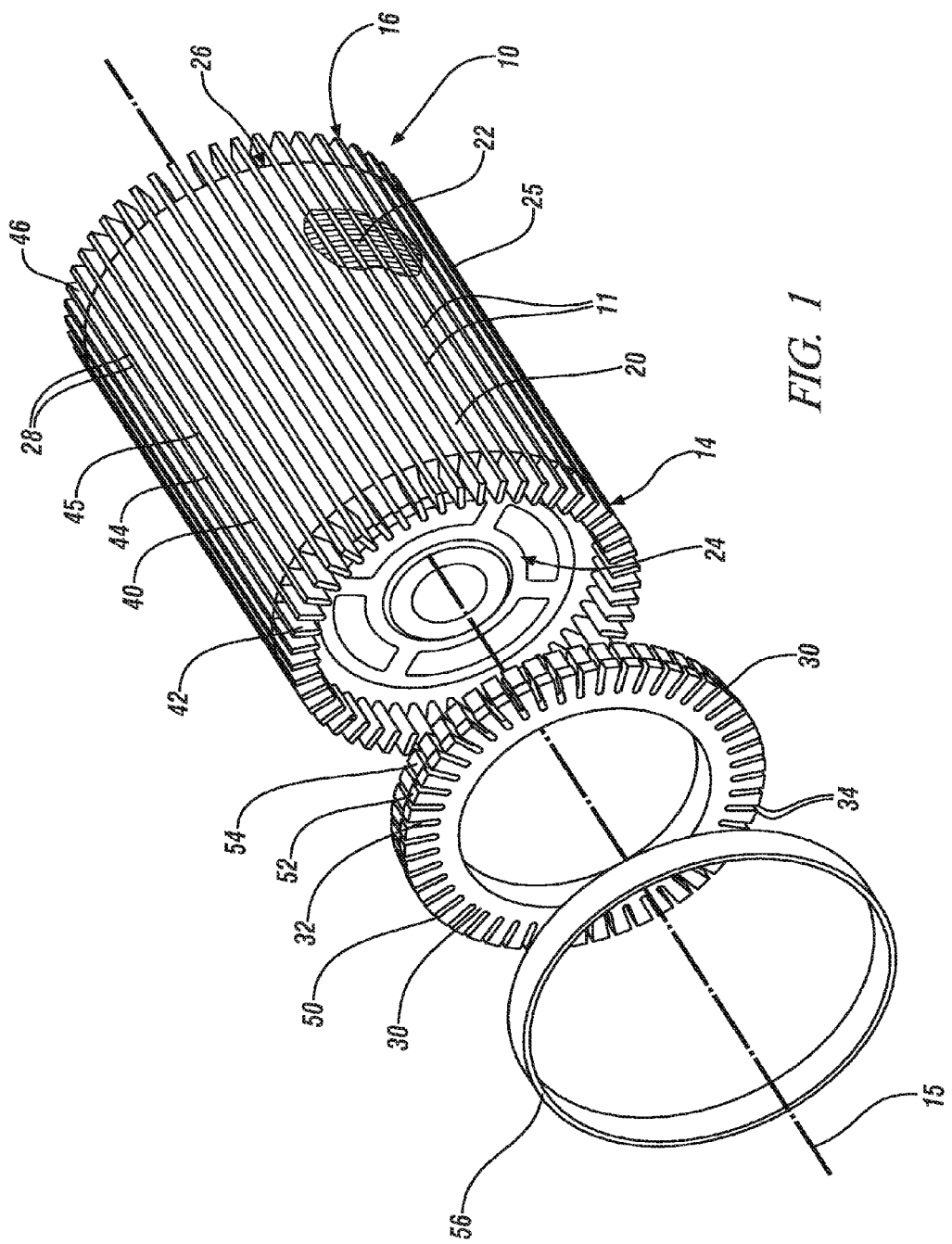
FIG. 1 illustrates a rotor assembly for an induction motor, in accordance with the present disclosure.

Referring now to the drawings, wherein the showings are for the purpose of illustrating certain exemplary embodiments only and not for the purpose of limiting the same, FIG. 1 is an isometric drawing illustrating a rotor assembly 10 for an induction motor. The induction motor may be any induction motor, including an induction motor for use on a powertrain system for a motor vehicle. The rotor assembly 10 is fixedly attached to a rotor shaft centered upon an axis of rotation 15 using any suitable manufacturing method, such as shrink fitting and lock-and-key torque fitting. It is appreciated that the rotor assembly 10 may be assembled onto such a rotatable axle element subsequent to rotor assembly. The rotor assembly 10 and the rotor shaft share the same axis of rotation 15.

The rotor assembly 10 includes a first end 14 and a second end 16. The rotor assembly 10 is configured to be assembled into and rotate within a stator of an induction motor.

The rotor assembly 10 includes an assembled cylindrically shaped steel laminate stack 20 and a plurality of radially-oriented conductor bars 40 electrically connected to annular-shaped shorting end rings 30 that are assembled onto one or each of first and second ends 24 and 26, respectively, of the steel laminate stack 20. The first end 24 of the steel laminate stack 20 corresponds to the first end 14 of the rotor assembly 10 and the second end 26 of the steel laminate stack 20 corresponds to the second end 16 of the rotor assembly 10. An axis of rotation of the steel laminate stack is coincident to the axis of rotation of the rotor assembly 10 and the rotor shaft.

The steel laminate stack 20 is fabricated from a plurality of thin laminate sheets 22 formed from ferric material. In one embodiment the laminate sheets 22 are 0.33 mm (0.013 inches) thick. The laminate sheets 22 are stamped using a fine blanking process or similar manufacturing process and are preferably electrically insulated to minimize eddy currents. Each laminate sheet 22 is a flat annular-shaped device and includes a plurality of radially-oriented apertures formed near an outer periphery thereof When the laminate sheets 22 are assembled into the steel laminate stack 20, the radially-oriented apertures are aligned to form grooves 28 that are parallel with the axis of rotation 15 and are radially-oriented near an outer periphery 25 of the steel laminate stack 20. Alternatively, the grooves 28 may include an acute angle in relation to the axis of rotation 15. The grooves and the conductor bars herein will be discussed as longitudinally oriented with respect to the axis of rotation; however, this orientation is understood to include either an alignment that is parallel to the axis of rotation or at an acute angle from parallel with respect to the axis of rotation. The grooves 28 may have any suitable cross-sectional shape, and are substantially rectangular-shaped in one embodiment. The longitudinally-oriented grooves 28 are equally spaced around the periphery 25. Conductor bars 40 are each located or embedded within one of the grooves 28. As is appreciated, the laminate sheets 22 are assembled onto the axis of rotation 15 in a laminated fashion using any suitable fabricating method.

The conductor bars 40 are preferably fabricated from copper-based materials and are added to each of the grooves 28 by any suitable process, including, e.g., insertion or molding. Alternatively, the conductor bars 40 may be fabricated from aluminum-based or other electrically conductive material. The conductor bars 40 are disclosed to include features at each of a first end and a second end of the conductor bars 40 although only the first end will be discussed in detail. It will be appreciated that the conductor bars 40 could include the features described on the first end only with different features according to another method utilized at the second end. Each conductor bar 40 includes a first portion 42, a main portion 44, and a second portion 46, and each has a peripheral edge 45. The first portion 42 projects laterally or extends longitudinally beyond the first end 24 of the steel laminate stack 20. The second portion 46 projects laterally beyond the second end 26 of the steel laminate stack 20. The main portion 44 is contained within the grooves 28 formed in the steel laminate stack 20. The peripheral edge 45 of each conductor bar 40 projects through the grooves 28 on the periphery 25 along the main portion 44, and further projects along the first and second portions 42 and 46.

Each of the annular-shaped shorting end rings 30 is preferably fabricated from copper-based materials and has a plurality of shorting end ring grooves 32 that correspond to the grooves 28 of the laminate stack 20. Alternatively, the shorting end rings 30 may be fabricated from aluminum-based materials or other electrically conductive materials. The shorting end ring grooves 32 are designed to accommodate one of the first and second portions 42, 46 of the conductor bars 40 by slip fit. Each shorting end ring 30 includes a stepped side portion 50 with a first periphery 52 having a larger diameter than a second periphery 54. The second periphery 54 is sized to accept a swage ring 56 when fully assembled between the first periphery 52 and the first end 24 of the steel laminate stack 20.

Each shorting end ring 30 is assembled to an end of the laminate stack 20 by inserting one of the first and second portions 42, 46 of the conductor bars 40 into the shorting end ring grooves 32. The shorting end ring grooves 32 are designed to have a slightly larger cross-section than the first and second portions 42, 46 of the conductor bars 40 for ease of assembly, thus forming voids 34 therebetween. The first and second portions 42, 46 of the conductor bars 40 may also be designed with a slight taper towards an outer end for ease of manufacturing and assembly. When the shorting end rings 30 are assembled onto the steel laminate stack 20, the first and second portions 42, 46 of the conductor bars 40 preferably project through the shorting end ring grooves 32 and are flush with the outer ends of the first periphery 52 of the shorting end rings 30.

Figure 2:
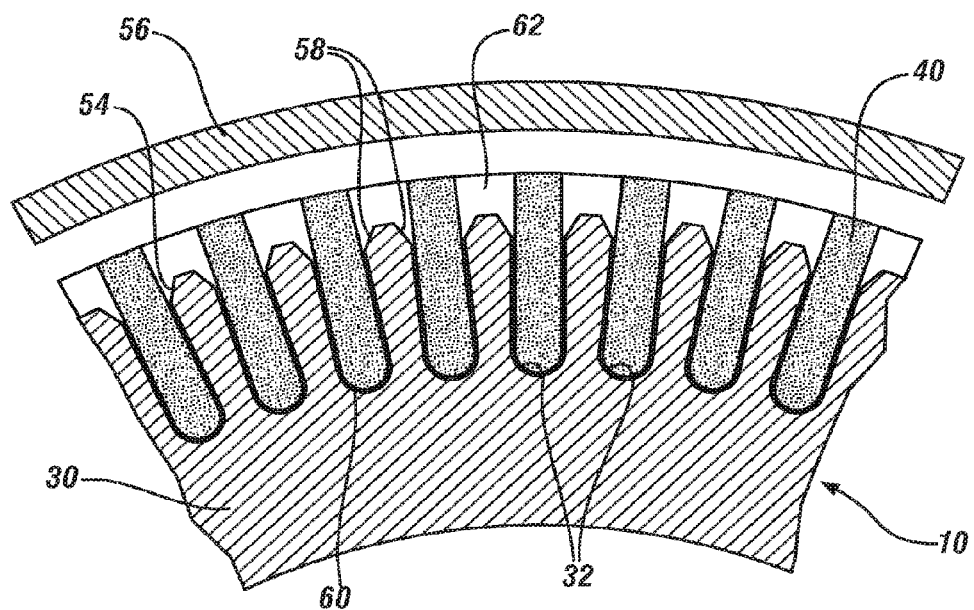
FIG. 2 illustrates a partial cross sectional view of the rotor assembly through the shorting end ring at the second periphery prior to a swaging operation, in accordance with the present disclosure.

FIG. 2 illustrates a partial cross sectional view of the rotor assembly 10 through the shorting end ring 30 at the second periphery 54 prior to a swaging operation. The shorting end ring 30 has been assembled onto the rotor assembly 10 by inserting the conductor bars 40 into the shorting end ring grooves 32. The swage ring 56 is positioned over the second periphery 54 of the shorting end ring 30. The conductor bars 40 may have a gap 60 surrounding each conductor bar in relation to the shorting end ring 30 either designed in or due to the machining process. It will be noted that the swage ring 56 is spaced apart from the shorting end ring 30 and the conductor bars 40, however an interference fit may be utilized to maintain the appropriate relationship to the shorting end ring 30 and the steel laminate stack 20 before the swaging operation. The second periphery 54 of the shorting end ring 30 preferably includes a relief 58 at the edge of the shorting end ring grooves 32. The diameter of the second periphery 54 and the relief 58 provide a crush area 62 that is defined by adjacent conductor bars 40, the second periphery 54 and the swage ring 56 for the material of the conductor bars 40 to gather during a swaging process. The swaging process is a process to provide a uniform compressive pressure to evenly reduce a metallic object, in this case, the swage ring 56. The crush area 62 includes enough area to provide the swage ring 56 alignment with the first periphery 52 of the shorting end rings 30 and the steel laminate stack 20.

Figure 3:
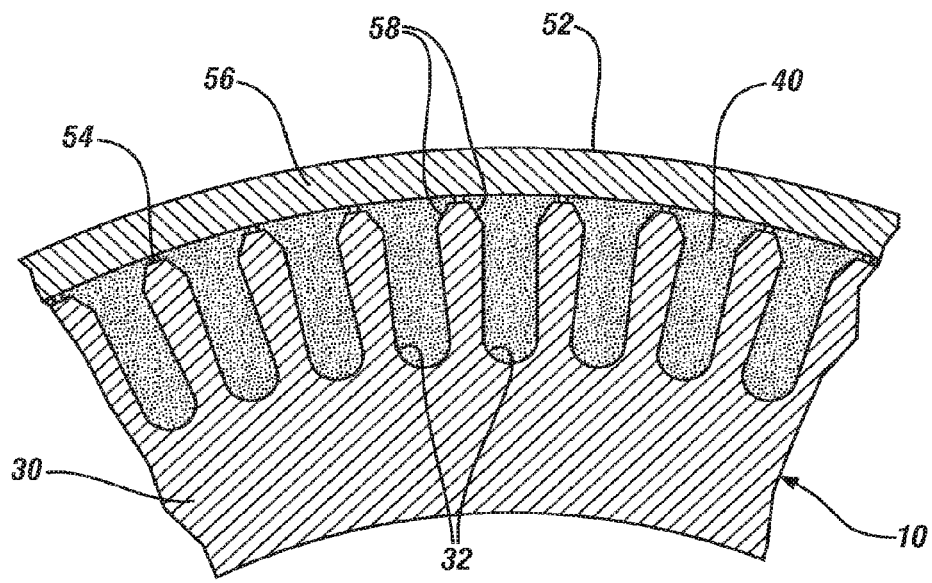
FIG. 3 illustrates a partial cross sectional view of the rotor assembly through the shorting end ring at the second periphery subsequent to a swaging operation, in accordance with the present disclosure.

FIG. 3 illustrates a partial cross sectional view of the rotor assembly 10 through the shorting end ring 30 at the second periphery 54 subsequent to a swaging operation. The swaging operation provides uniform pressure to the swage ring 56 across an outer periphery to uniformly compress the swage ring 56. The pressure is transferred as a compressive force applied to each of the conductor bars 40 around a perimeter of the shorting end rings 30 thereby causing the conductor bars 40 to deform. The deforming of the conductor bars 40 fills the shorting end ring grooves 32 substantially eliminating any gap that may have been present. The relief 58 of the second periphery 54 allows the conductor bars 40 to deform and gather. It is understood the distance from the first periphery 52 to the second periphery 54 may be sufficient to allow the conductor bars 40 to deform and gather without the need for the relief 58 of the second periphery 54.

The swaging process reduces the swage ring to an outer diameter size approximately equivalent to and flush with the first periphery 52 and the laminate stack 20 thereby creating a smooth, cylindrically shaped outer surface to the rotor. Any material that extends beyond the outer surface of the first periphery 52 of the shorting end ring 30 and the laminate stack 20 can be machined away by any known process in the art. The swage ring 56 and the deformed ends of the conductor bars 40 create a mechanical lock between the shorting end rings 30 and the conductor bars 40, thereby also affixing the shorting end rings 30 to the steel laminate stack. It will be recognized that in certain swaging processes a swage ring 56 may not be necessary. Instead, the swaging operation occurs directly upon the conductor bars 40, applying a compressive force around a perimeter of the shorting end rings 30 to the conductor bars 40 and deforming the conductor bars to lock the shorting end rings 30 to the conductor bars. It will be apparent that the swaging operation can occur on either the first end 14 or second end 16 independently or on both the first end 14 and second end 16 simultaneously.

Figure 4:
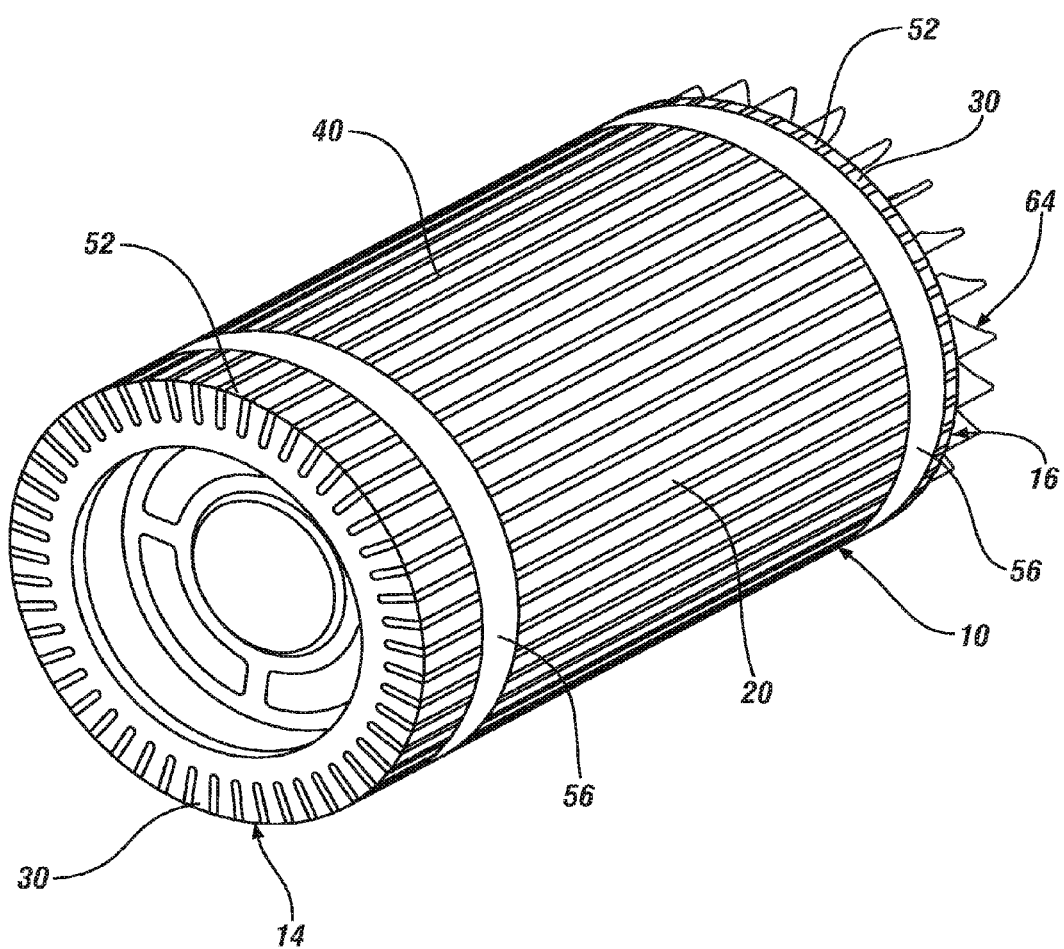
FIG. 4 illustrates the rotor assembly for an induction motor subsequent a swaging event on both the first and second ends, respectively, in accordance with the present disclosure.

FIG. 4 is an isometric drawing illustrating the rotor assembly 10 for an induction motor subsequent a swaging event on both the first and second ends 14, 16, respectively. The rotor assembly 10 includes shorting end rings 30 inserted onto the plurality of conductor bars 40. The swage rings 56 have been swaged into place between the first periphery 52 and the steel laminate stack 20. Any additional material extending beyond the first periphery 52 has been removed by machining to provide a relatively smooth exterior of the rotor assembly 10. The second end 16 of the steel laminate stack 20 includes a plurality of heat sinks 64 attached thereto to provide additional cooling properties. The heat sinks 64 can vary in number, shape, and size for a specific application. It will be apparent that the machining process can include machining each piece of the rotor assembly 10, e.g., the shorting end rings 30, swage rings 56, conductor bars 40, and the steel laminate stack 20, that may extend beyond the desired exterior of the rotor assembly 10. It is understood that swaging the shorting end rings 30 may include swaging a single shorting end ring 30 or both shorting end rings 30.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for fabricating a rotor assembly for an induction motor, comprising:
   assembling a shorting end ring onto the rotor assembly comprising a steel laminate stack and a plurality of conductor bars, wherein the shorting end ring comprises a plurality of grooves aligned with corresponding portions of the conductor bars extending from a first end of the steel laminate stack, and wherein the assembling comprises inserting the corresponding portions of the conductor bars into the grooves of the shorting end ring; and
   affixing the shorting end ring to the rotor assembly by applying a compressive force around a perimeter of the shorting end ring to deform the conductor bars.

2. The method of claim 1, wherein applying a compressive force around the perimeter of the shorting end ring comprises:
   positioning a swage ring around the shorting end ring; and
   compressing the swage ring onto the shorting end ring.

3. The method of claim 1, further comprising assembling a second shorting end ring onto the rotor assembly, comprising the steel laminate stack and the plurality of conductor bars, wherein the second shorting end ring comprises a plurality of grooves aligned with corresponding portions of the conductor bars extending from a second end of the steel laminate stack, and wherein the assembling comprises inserting the corresponding portions of the conductor bars into the grooves of the second shorting end ring.

4. The method of claim 2, wherein the shorting end ring comprises a first periphery substantially flush with an outer surface of the steel laminate stack and a second periphery aligned with the swage ring, wherein the swage ring is compressed substantially flush with the outer surface of the steel laminate stack.

5. The method of claim 1, wherein the conductor bars comprise copper.

6. The method of claim 1, wherein the conductor bars comprise aluminum.

7. The method of claim 1, wherein the shorting end ring comprises copper.

8. The method of claim 1, wherein the shorting end ring comprises aluminum.

9. The method of claim 2, further comprising machining the rotor assembly subsequent to compressing the swage ring to remove material extending beyond an outer surface of the steel laminate stack.

10. The method of claim 1, wherein the conductor bars are in a parallel relation with an axis of rotation of the rotor.

11. The method of claim 1, wherein the conductor bars have an acute angle relationship with an axis of rotation of the rotor.

12. The method of claim 1, wherein the shorting end ring comprises a plurality of heat sinks.

13. A rotor assembly for an induction motor, comprising:
   a cylindrically shaped steel laminate stack including a plurality of grooves around the periphery of the steel laminate stack and oriented longitudinally to the steel laminate stack;
   a plurality of conductor bars, each conductor bar located in one of the plurality of grooves and comprising a respective first end projecting from a first end of the steel laminate stack;
   a shorting end ring comprising a plurality of grooves, each groove mated with one of the respective first ends of the plurality conductor bars; and
   wherein the first ends of the plurality of the conductor bars are sufficiently compressively deformed to mechanically lock the conductor bars to the shorting end ring.

14. A rotor assembly for an induction motor, comprising:
   a cylindrically shaped steel laminate stack including a plurality of grooves around the periphery of the steel laminate stack and oriented longitudinally to the steel laminate stack;
   a plurality of conductor bars, each conductor bar located in one of the plurality of grooves and comprising a respective first end projecting from a first end of the steel laminate stack;
   a shorting end ring comprising a plurality of grooves, each groove mated with one of the respective first ends of the plurality of conductor bars; and
   a swage ring surrounding a portion of the shorting end ring and mated first ends of the plurality of conductor bars and compressively deforming the first ends of the plurality of the conductor bars sufficient to mechanically lock the conductor bars to the shorting end ring.

15. A rotor assembly of claim 14 wherein each conductor bar further comprises a respective second end projecting from a second end of the steel laminate stack, and further comprising:
   a second shorting end ring comprising a plurality of grooves, each groove mated with one of the respective second ends of the plurality of conductor bars; and
   a second swage ring surrounding a portion of the second shorting end ring and mated second ends of the plurality of conductor bars and compressively deforming the second ends of the plurality of the conductor bars sufficient to mechanically lock the conductor bars to the second shorting end ring.

* * * * *